(12) United States Patent
Houk (10) Patent No.: US 8,205,932 B1
(45) Date of Patent: Jun. 26, 2012

(54) AIR FOIL WING FOR TRAILER

(76) Inventor: Shawn Houk, Oklahoma City, OK (US)

( * ) Notice: Subject to any disclaimer, the term of this patent is extended or adjusted under 35 U.S.C. 154(b) by 0 days.

(21) Appl. No.: 12/876,537

(22) Filed: Sep. 7, 2010

Related U.S. Application Data (60) Provisional application No. 61/239,844, filed on Sep. 4, 2009.

(51) Int. Cl.
*B62D 35/00* (2006.01)

(52) U.S. Cl. .................................. 296/180.4; 296/180.5

(58) Field of Classification Search ..... 296/180.1–180.5
See application file for complete search history.

(56) References Cited

U.S. PATENT DOCUMENTS

| | | | | |
|---|---|---|---|---|
| 3,455,594 A | * | 7/1969 | Mrlik et al. | 296/180.5 |
| 3,596,974 A | * | 8/1971 | Adams | 296/180.2 |
| 3,623,745 A | * | 11/1971 | Taylor | 280/5.514 |
| 3,822,910 A | | 7/1974 | Wiley, Jr. | |
| 3,866,967 A | * | 2/1975 | Landry et al. | 296/180.4 |
| D241,531 S | | 9/1976 | Mueller | |
| 4,056,279 A | | 11/1977 | Dorsch | |
| 4,082,340 A | | 4/1978 | Taylor | |
| 4,093,300 A | | 6/1978 | Snizek | |
| 4,153,288 A | | 5/1979 | Mueller | |
| 4,156,543 A | | 5/1979 | Taylor et al. | |
| 4,360,232 A | * | 11/1982 | Elder | 296/180.4 |
| 4,468,060 A | * | 8/1984 | FitzGerald et al. | 296/180.4 |
| 4,470,628 A | | 9/1984 | Husted | |
| 4,627,657 A | | 12/1986 | Daniels et al. | |
| 4,779,915 A | * | 10/1988 | Straight | 296/180.3 |
| 5,480,174 A | * | 1/1996 | Grenier | 280/414.1 |
| 5,487,586 A | * | 1/1996 | Kinkaide | 296/180.1 |
| 5,513,894 A | | 5/1996 | Ragsdale | |
| 5,762,374 A | * | 6/1998 | Grove et al. | 280/847 |
| 6,099,069 A | * | 8/2000 | Spears | 296/180.2 |
| 6,170,904 B1 | * | 1/2001 | Schaedlich et al. | 296/180.1 |
| 6,257,654 B1 | * | 7/2001 | Boivin et al. | 296/180.5 |
| 6,286,894 B1 | * | 9/2001 | Kingham | 296/181.5 |
| D449,795 S | | 10/2001 | Brys | |

(Continued)

OTHER PUBLICATIONS

Chrome Shop. Semi-Truck Wings, Semi-Truck Accessories, Semi-Truck Exhaust, Semi-Truck Bumpers . . . The Original Turbowing. http://www.32chrome.com/wings.htm. Accessed Dec. 30, 2008.

*Primary Examiner* — Glenn Dayoan
*Assistant Examiner* — Gregory Blankenship
(74) *Attorney, Agent, or Firm* — Montgomery Patent & Design, LLC; Robert C. Montgomery; Joseph T. Yaksich (57) ABSTRACT

An air foil structure attachable to a semi-trailer of a tractor-trailer rig is herein disclosed, intended to produce various aerodynamic affects such as reducing turbulence, creating lift, and creating down force. The air foil apparatus is mounted to a trailer chassis and extends upwardly to a height approximately that of the cab portion of the tractor. The air foil apparatus comprises a stationary pedestal structure having a pair of attached vertical hydraulic cylinders which connect to the air foil wing portion. The hydraulic cylinders enable height adjustment of the air foil wing by an operator during transit via a remote controller within the cab area. The angle of the wing may be manually adjusted and secured in position via pivoting trunnion mounts. The current height of the air foil wing is displayed upon the remote controller allowing an operator to effectively lower the air foil wing during transit when approaching height-restricting objects.

18 Claims, 8 Drawing Sheets

U.S. PATENT DOCUMENTS

| | | |
|---|---|---|
| 6,347,826 B1 * | 2/2002 | Horner et al. .................... 296/98 |
| 6,672,651 B1 * | 1/2004 | Shuen ......................... 296/180.5 |
| 6,712,424 B2 * | 3/2004 | Swain ......................... 296/180.1 |
| 6,814,395 B1 * | 11/2004 | Lin ............................. 296/180.1 |
| 6,926,346 B1 * | 8/2005 | Wong et al. ................ 296/180.5 |
| 7,213,870 B1 * | 5/2007 | Williams .................... 296/180.5 |
| 7,234,761 B1 * | 6/2007 | Crean ........................ 296/180.4 |
| 7,770,962 B1 * | 8/2010 | Maxwell .................... 296/180.5 |
| 7,950,720 B2 * | 5/2011 | Skopic ....................... 296/180.1 |
| 2008/0023985 A1 * | 1/2008 | Nahm et al. ............... 296/180.1 |
| 2008/0116715 A1 * | 5/2008 | Steel .......................... 296/180.1 |
| 2010/0090497 A1 * | 4/2010 | Beckon ...................... 296/180.5 |
| 2011/0181072 A1 * | 7/2011 | Kempster .................. 296/180.5 |

* cited by examiner

AIR FOIL WING FOR TRAILER

RELATED APPLICATIONS

The present invention was first described in and claims the benefit of U.S. Provisional Application No. 61/239,844 filed Sep. 4, 2009, the entire disclosures of which are incorporated herein by reference.

FIELD OF THE INVENTION

The present invention relates generally to large vehicles such as tractor trailers, and in particular, to an air foil assembly adapted for providing aerodynamic features to such a vehicle.

BACKGROUND OF THE INVENTION

Much emphasis has been placed on the mileage performance of passenger vehicles in recent times. In particular, air drag represents a major component of gas expenditure during a normal vehicle driving process. As a result, aerodynamic enhancements to the design of cars and other motor vehicles have been a significant focus in recent decades. Efforts to improve the aerodynamic features of vehicles include developments to spoilers, vehicle shape, vehicle size, and materials.

While such technology has been advantageously applied to small commercial vehicles, large vehicles such as tractor-trailer rigs are a far bigger user of fuel on a proportional basis. While some of the same technological advantages that are used on cars can be used on such trucks, the shape of such trucks is one (1) significant disadvantage of the truck-trailer combination cannot be overlooked. The general box shape of trucks that is so advantageous when hauling goods is terrible when going down the highway. This poor aerodynamic shape coupled with the high weight of a tractor-trailer rig results not only in poor fuel economy, but places increased stress and strain upon the engine, tires, suspension components and the like. This poor fuel economy and high operating costs results in not only reduced profits for the owner, but higher cost for all.

Various attempts have been made to provide air manipulating or deflecting assemblies for large vehicles. Examples of these attempts can be seen by reference to several U.S. Pat. No. 3,596,974, issued in the name of Adams, describes an air current deflecting device for a car or the like while towing a larger, flat-fronted object such as a trailer.

U.S. Pat. No. 4,082,340, issued in the name of Taylor, describes an air current deflecting device with a bellows style angle adjustability feature for reducing drag across a top surface of a vehicle.

U.S. Pat. No. 4,156,543, issued in the name of Taylor et al., describes a similar air current deflecting device with a bellows style angle adjustability feature particularly adapted for use on the cab of a tractor trailer combination.

U.S. Pat. No. 5,513,894, issued in the name of Ragsdale, describes a rigid air deflecting tank particularly adapted for use on the roof of a tow vehicle.

While these devices fulfill their respective, particular objectives, each of these references suffer from one (1) or more of the aforementioned disadvantages. Many such devices are not adapted for use on the trailer portion of a tractor trailer combination. Also, many such devices are not adjustable. Furthermore, many such devices are not easily manipulated from an elevated position, such as the top of a trailer. In addition, many such devices are unmanageable while driving. Accordingly, there exists a need for an air foil for large motor vehicles without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for an air drag reducing device for large motor vehicles which is simple to adjust and manipulate for use on a large roof and while driving in order to avoid potential issues such as low-clearance portions of a driving route. Thus, the object of the present invention is to solve the aforementioned disadvantages and provide for this need.

To achieve the above objectives, it is an object of the present invention to positively affect a flow of air over a semi-trailer or similar large motor vehicle in order to provide various aerodynamic effects. The device comprises an air foil, a pair of trunnion mounts, a pair of hydraulic lift cylinder assemblies, a pedestal, and a mounting bar portion.

Another object of the present invention is to provide secure attachment to an existing motor vehicle via the mounting bar portion which ruggedly attaches to a front or rear lower edge of a vehicle trailer via a plurality of mechanical fasteners.

Yet still another object of the present invention is to provide a height adjustment means via the pair of hydraulic lift cylinder assemblies. This allows a user to selectively position the air foil for optimal placement along a top portion of a vehicle in order to affect air flow.

Yet still another object of the present invention is to provide angular adjustment of the air foil via pivoting connection of the air foil to the pair of trunnion mounts. Each trunion mount is located at a top end of a hydraulic lift cylinder assembly.

Yet still another object of the present invention is to provide a means to affect a variety of aerodynamic effects including increased laminar flow, lift conditions, and down force conditions via selectively angular adjustment of the air foil.

Yet still another object of the present invention is to construct the air foil of a corrosion-resistant lightweight material in order to increase longevity and performance over an extended period of time.

Yet still another object of the present invention is to provide a means for powered adjustment of the hydraulic cylinders and trunnions via an integral linear encoder device. The linear encoder further provides a means for a user to remotely adjust the height and angle of the air foil.

Yet still another object of the present invention is to comprise a user-operated remote control assembly within the cab of the vehicle which is in electronic communication with the linear encoder. This allows a user to selectively adjust the air foil while driving.

Yet still another object of the present invention is to provide the remote control assembly with a vertical height indicator so that a user may assess and subsequently adjust the height of the foil while driving in order to avoid low-clearance obstacles such as bridges and underpasses.

Yet still another object of the present invention is to comprise a pedestal assembly which provides a horizontal supporting means for the hydraulic cylinder assemblies. The pedestal assembly engages the mounting bar portion of the device and provides a rigid support capable of withstanding torsional forces resulting from wind resistance against the air foil during use.

Yet still another object of the present invention is to provide a method of utilizing the device that provides a unique means of obtaining an instance of the device, assembling the pedestal and hydraulic cylinder assemblies, affixing the mounting bar to a lower edge of an existing vehicle trailer, assembling the pedestal and hydraulic cylinder assemblies along with associated componentry, installing an air foil of a desired design, adjusting the height and angle of the air foil to a desired position, installing the remote control assembly in a cab portion of the vehicle, powering the hydraulic cylinder assemblies via integral connection to the power system of the vehicle, and selectively adjusting the device during transit via the remote control assembly.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | air foil wing for trailers |
|---|---|
| 20 | air foil |
| 22 | trunnion mount |
| 24 | trunnion shaft |
| 25 | trunnion shaft aperture |
| 26 | trunnion pivot aperture |
| 30 | first hydraulic cylinder assembly |
| 31 | cylinder body |
| 32 | cylinder shaft |
| 33 | cylinder shaft aperture |
| 34 | hydraulic hose connection |
| 35 | cylinder flange |
| 40 | second hydraulic cylinder assembly |
| 45 | encoder |
| 50 | pedestal assembly |
| 52 | mounting bar |
| 53 | mounting aperture |
| 54 | pedestal leg |
| 56 | pedestal cross-member |
| 58 | mounting foot |
| 60 | hydraulic pump system |
| 62 | pump |
| 64 | motor |
| 66 | solenoid valve |
| 68 | pump hose |
| 70 | remote controller assembly |
| 71 | remote controller cord |
| 72 | controller housing |
| 74 | UP button |
| 76 | DOWN button |
| 78 | height indicator |
| 90 | knob/stud fastener |
| 91 | hydraulic hose |
| 92 | hose connector |
| 93 | "T"-fitting |
| 94 | fastener aperture |
| 95 | wiring |
| 96 | electrical connector |
| 100 | semi-trailer |
| 102 | tank trailer |
| 104 | flat bed trailer |
| 110 | semi-tractor |
| 112 | existing battery |
| 115 | common fastener |
| 150 | tractor-trailer rig |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
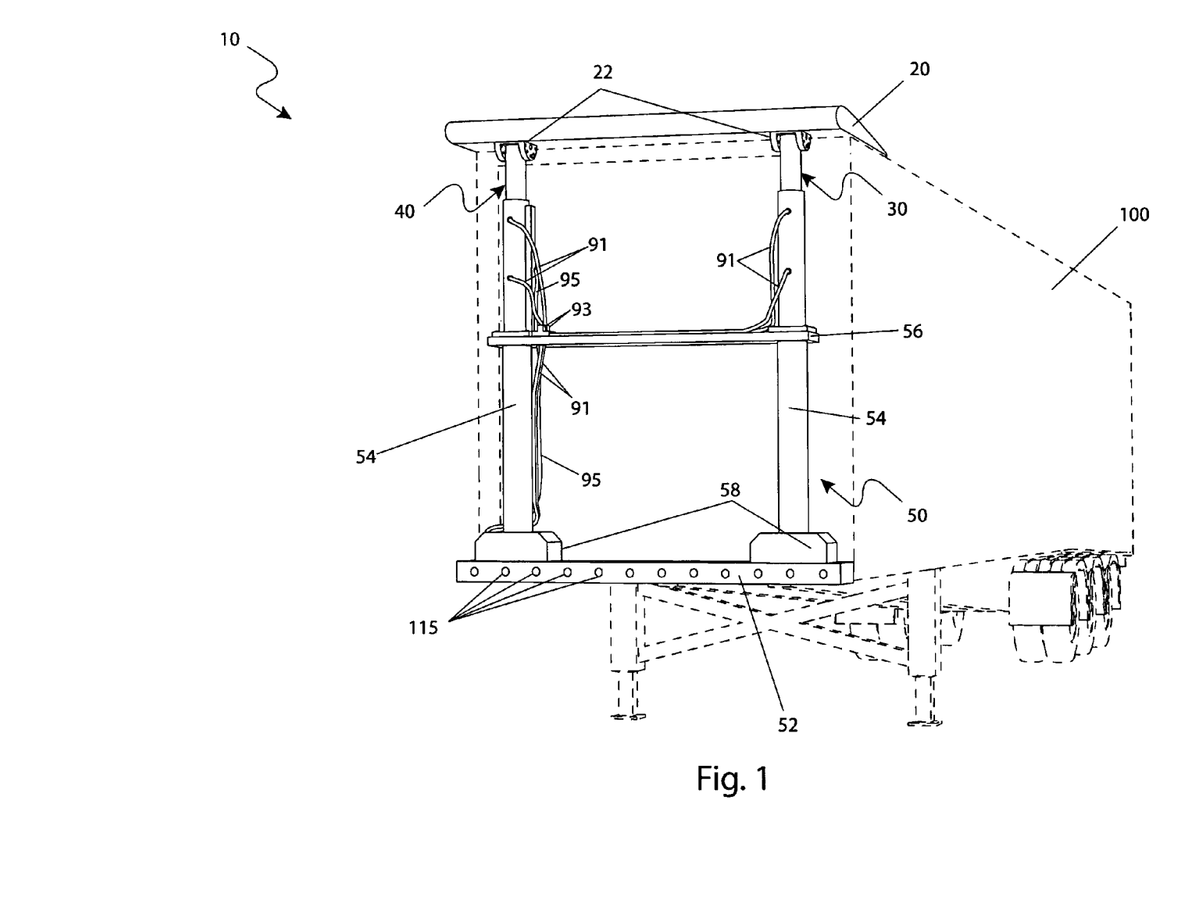
FIG. 1 is an environmental view of an air foil wing for trailers 10 installed onto a semi-trailer 100, according to a preferred embodiment of the present invention.

Referring now to FIG. 1, an environmental view of the air foil wing for trailers (herein described as the "apparatus") 10 according to the preferred embodiment of the present invention, is disclosed. The device 10 comprises an air foil 20 which affects a flow of air over a semi-trailer 100, thereby by creating various aerodynamic affects over said semi-trailer 100. The apparatus 10 comprises a mounting bar portion 52 which ruggedly attaches to a forward lower edge of the semi-trailer 100 via a plurality of common fasteners 115 such as bolts. The apparatus 10 provides a height-adjustable means via a first hydraulic lift cylinder assembly 30 and a second hydraulic lift cylinder 40, as well as an angular adjustment means of a top-mounted air foil portion 20 via a pair of selectively pivoting trunnion mounts 22 (see FIG. 4).

Figure 2:
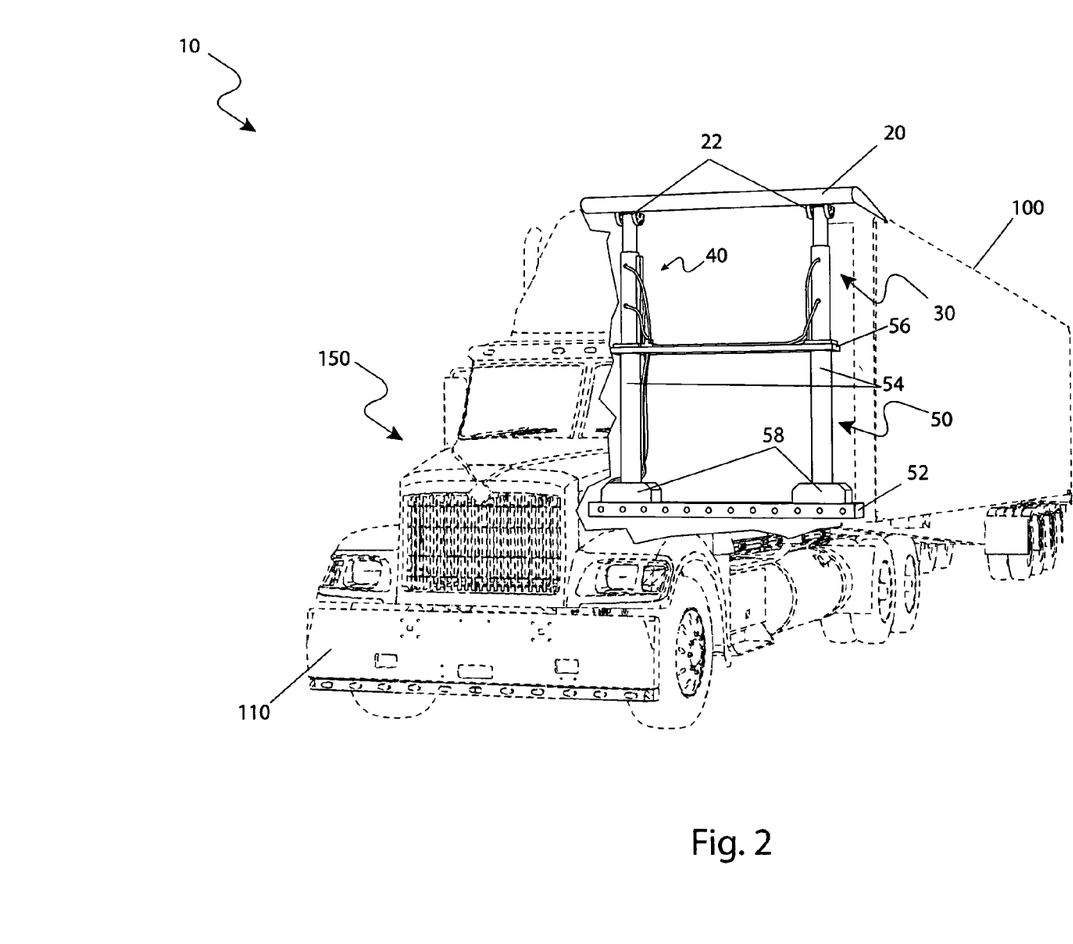
FIG. 2 is an environmental view of the air foil wing for trailers 10 depicting attachment of a semi-tractor 110 to the semi-trailer 100, according to the preferred embodiment of the present invention.

Referring now to FIG. 2, an environmental of the apparatus 10 depicting attachment of a semi-tractor 110 to the semi-trailer 100, according to the preferred embodiment of the present invention, is disclosed. The apparatus 10 is illustrated here being installed on a front of a semi-trailer portion 100 and behind a semi-tractor portion 110 of a combined tractor-trailer rig 150. The apparatus 10 provides a means to selectively angle an air foil portion 20 incrementally between approximately twenty degrees (20°) downward and twenty degrees (20°) upward relative to a horizontal plane. Said angular adjustability of the air foil 20 creates a variety of aerodynamic effects including improving laminar flow over said semi-trailer 100, creating a lift condition, and creating a down-force condition, while the tractor-trailer rig 150 moves over a highway surface, thereby providing an improvement in stability and energy usage.

Figure 3A:
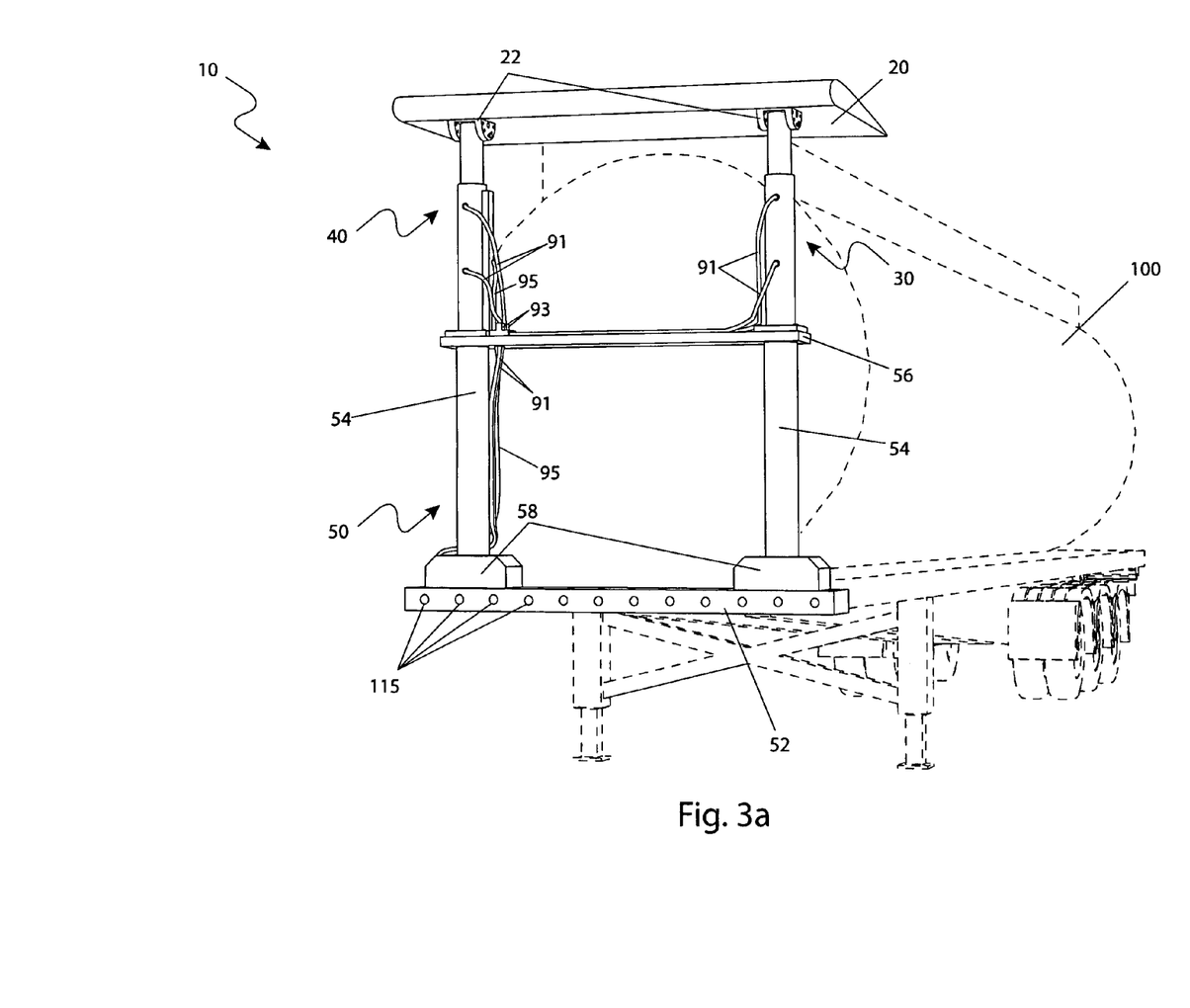
FIG. 3a is an environmental of the air foil wing for trailers 10 installed onto the front of a tank trailer 30, according to the preferred embodiment of the present invention.
Figure 3B:
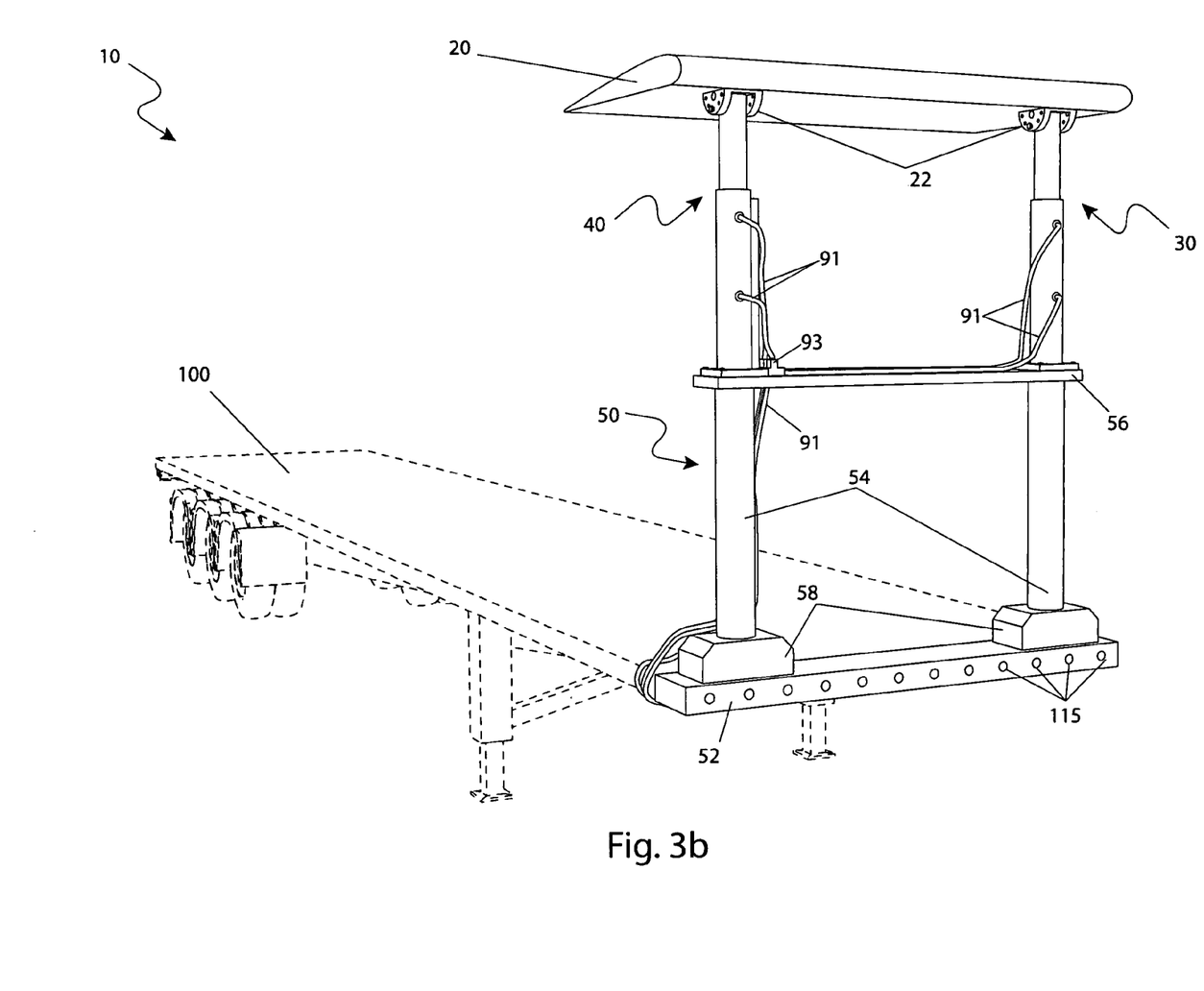
FIG. 3b is an environmental of the air foil wing for trailers 10 installed onto the front of a flat-bed trailer 49, according to the preferred embodiment of the present invention.

Referring now to FIGS. 3a and 3b, environmental views of the apparatus 10 being installed upon front portions of a tank trailer 102 and a flat bed trailer 104, respectively, according to the preferred embodiment of the present invention, are disclosed. The tank trailer 102 and the flat bed trailer 103 being equipped with the apparatus 10 are to be coupled to the semi-tractor 110 in a similar manner as the previously described box-shaped semi-trailer 100 as depicted within FIG. 1, Therefore, installation, positioning, and functioning of the apparatus 10 when applied to the aforementioned trailer types 102, 103 is envisioned to provide equal benefits to a user.

Figure 4:
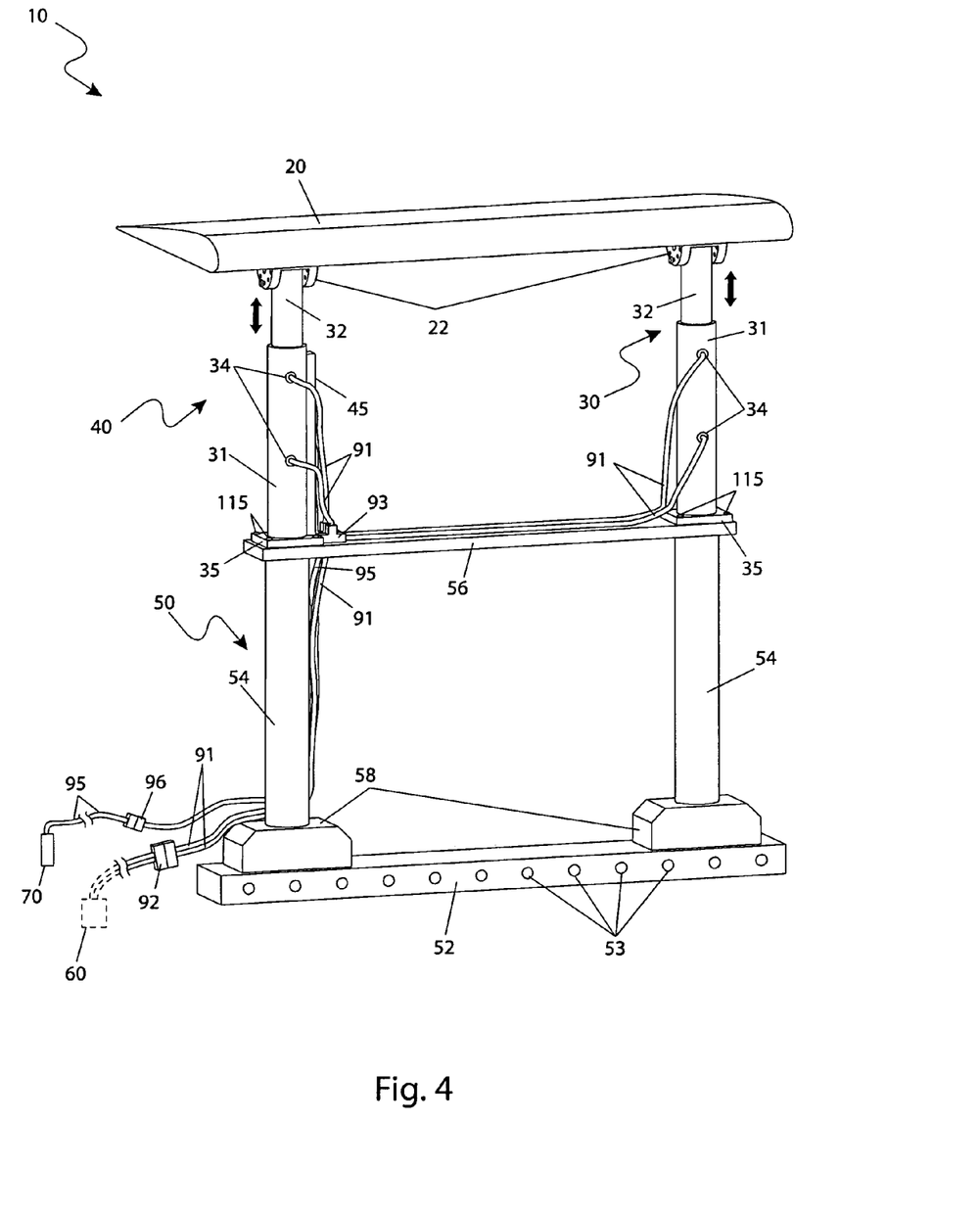
FIG. 4 is a close-up view of the air foil wing for trailers 10, according to the preferred embodiment of the present invention.
Figure 5A:
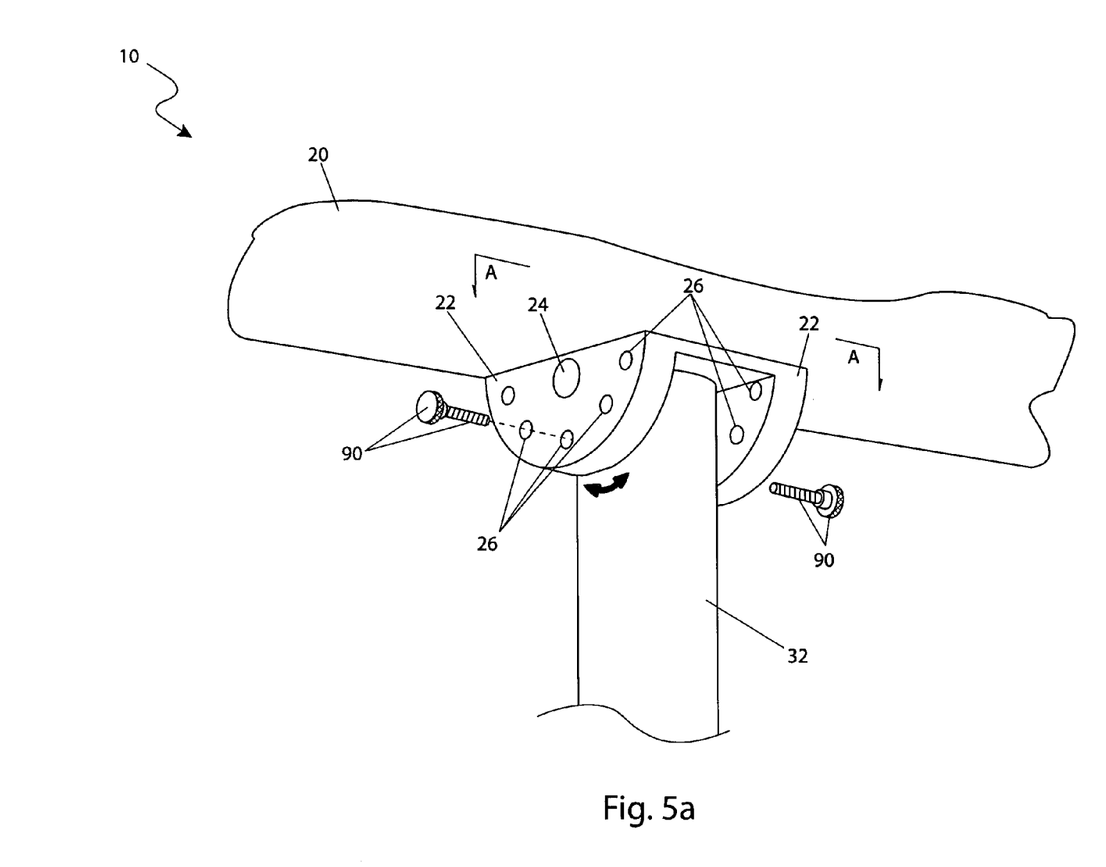
FIG. 5a is a close-up perspective view of a trunnion mount portion 22 of the air foil wing for trailers 10, according to the preferred embodiment of the present invention.
Figure 5B:
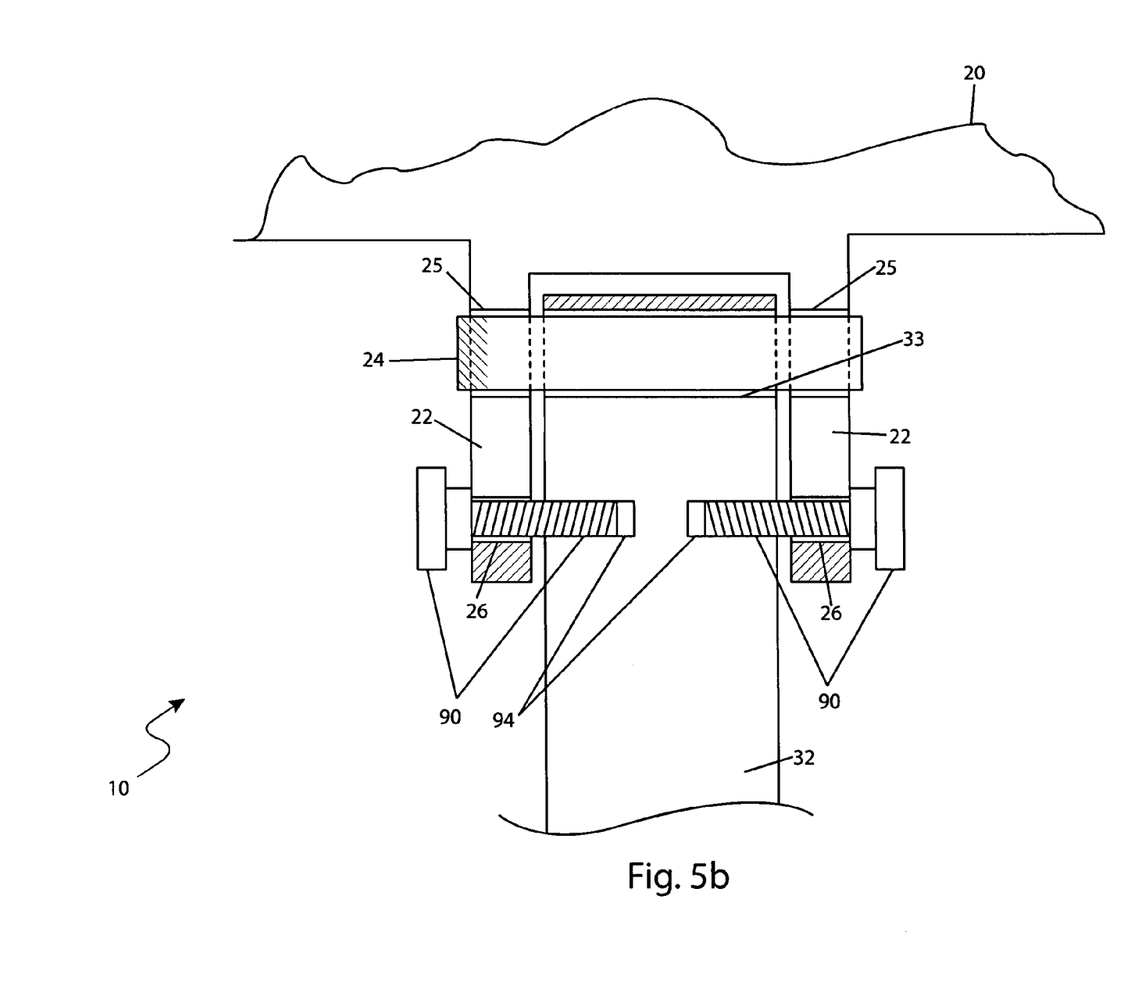
FIG. 5b is a section view of a trunnion mount portion 22 of the air foil wing for trailers 10 taken along section line A-A (see FIG. 5a), according to the preferred embodiment of the present invention; and, FIG. 6 is a control block diagram of the air foil wing for trailers 10, according to the preferred embodiment of the present invention.

Referring now to FIG. 4, a close-up view of the apparatus 10, according to the preferred embodiment of the present invention, is disclosed. The apparatus 10 comprises an air foil 20, a first hydraulic lift cylinder assembly 30, a second hydraulic lift cylinder 40, and a pedestal assembly 50. The air foil 20 preferably comprises an airplane wing-type airfoil structure providing a tapered trailing-edge design and being introduced having conventional thin or thick cross-sectional profiles; however, said air foil 20 may also be introduced in a flat-surface or "spoiler" configuration enabling additional desired aerodynamic effects and as such should not be interpreted as a limiting factor of the air foil 20 portion of the apparatus 10. The air foil 20 is envisioned to comprise an overall width similar to that of a standard semi-tractor 110 and made of corrosion-resistant light-weight materials such as, but not limited to: aluminum, resin plastic, fiberglass, or the like, and is envisioned to be introduced in a variety of colors and patterns to accent colors of an existing tractor-trailer rig 150. The air foil 20 further comprises a pair of integrally-molded or machined trunion mounts 22 protruding downwardly from a bottom surface and being located approximately one (1) foot from each outer end of said air foil 20. The trunnion mounts 22 provide a means to pivot said air foil 20 forwardly and rearwardly about a longitudinal axis established by respective trunion shafts 24 (see FIG. 5). Said trunnion mounts 22 enable selective angling of said air foil 20 so as to produce a variety of aerodynamic effects including reducing turbulence, creating a lift condition, creating a down-force condition, and the like, while a tractor-trailer rig 150 moves over a highway surface, thereby possibly improving vehicle stability and energy usage.

The first 30 and second 40 hydraulic lift cylinders occupy respective right-hand and left-hand vertical positions being affixed to a bottom surface of the horizontal air foil 20 via respective trunnion mounts 22. Said lift cylinders 30, 40 provide synchronous lifting and lowering of the attached air foil portion 20, thereby providing a positioning means with respect to a height of the semi-tractor 110 while also providing a safety means to said air foil 20 by enabling a lowering function as needed to compensate for low overhead conditions presented by bridges, underpasses, and other height-restricting structures while in transit. Said hydraulic lift cylinders 30, 40 comprise standard commercially available units being approximately three (3) feet in height when in a collapsed state and are to be mounted in an upright orientation. Said hydraulic lift cylinders 30, 40 provide approximately two (2) feet of vertical telescoping motion via a flow of hydraulic fluid in a conventional manner from a hydraulic pump system portion 60 (see FIG. 6). Each cylinder 30, 40 comprises expected members including a lower cylindrical body 31, an upwardly extending cylinder shaft 32, and a pair of common high-pressure hydraulic hose connectors 34. Each lifting cylinder 30, 40 is to be anchored at a bottom portion to the subjacent pedestal assembly 50 via a perpendicularly extending integral flange portion 35 being welded to bottom end portions of said cylinder assemblies 30, 40. Said cylinder assemblies 30, 40 are in turn affixed to the pedestal assembly 50 via a plurality of common fasteners 115 such as bolts, studs and nuts, or the like. Furthermore, the second hydraulic cylinder assembly 40 comprises an integral linear encoder device 45 which provides a means to electrically communicate and display an extended height of the second cylinder assembly 40 upon a remote controller assembly 70 (see FIG. 6).

The pedestal assembly 50 provides a means to elevate the cylinder assemblies 30, 40 and the air foil 20 as well as provide rugged attachment thereof to the semi-trailer 102. The pedestal assembly 50 comprises a rigid one-piece weldment capable of withstanding torsional forces resulting from wind resistance against the air foil 20 when in transit. The pedestal assembly 50 further comprises a bottom horizontal rectangular mounting bar 52, a pair of opposing vertical pedestal legs 54, and an upper pedestal cross-member 56 which horizontally spans said pedestal legs 54, thereby forming a rigid rectangular structure. The pedestal cross-member 56 provides a flat top surface onto which the cylinder assemblies 30, 40 may be mounted. The pedestal legs 54 are rigidly affixed to the mounting bar 52 via respective mounting feet 58 which act to distribute relative torsional forces and increase a weld area between said pedestal legs 54 and the mounting bar 52.

The mounting bar portion 52 of the pedestal assembly 50 provides secure attachment of a bottom portion of the apparatus 10 to a forward lower edge of the semi-trailer 100 via a plurality of common fasteners 115, such as bolts or the like, being horizontally inserted into respective mounting aperture portions 53 of the mounting bar 52 being machined or cast into said mounting bar 52. A top portion of the pedestal assembly 50 is fastened to the aforementioned cylinder flange portions 35 of the cylinder assemblies 30, 40 as previously described. The combined height of the pedestal assembly 50 and the cylinder assemblies 30, 40 shall position a top surface of the air foil 20 approximately thirteen (13) to sixteen (16) feet above a road surface over a retracted/expanded range of the cylinder assemblies 30, 40. Manual adjustment of an angle of the air foil 20 is enabled by respective integral features of the trunnions 22 (see FIGS. 5a, 5b). Adjustment of the height of the air foil 20 is provided via a hydraulic pump system 60 and a user-operated remote control assembly 70 mounted within a cab portion of the semi-tractor 110 (see FIG. 6). The pedestal assembly 50 is envisioned being made of strong metal materials such as steel, aluminum, or the like.

Referring now to FIGS. 5a and 5b, close-up and section views of a trunnion mount portion 22 of the apparatus 10, according to the preferred embodiment of the present invention, are disclosed. The air foil 20 comprises a pair of integral trunnion mounts 22 being positioned at opposing ends of a bottom surface of said air foil 22 which provide an attachment means to respective cylinder assemblies 30, 40. Each trunnion mount 22 comprises a pair of protruding semi-circular parallel members having an included gap of approximately three (3) to four (4) inches between, so as to receive a respective cylinder shaft portion 32 between. Each cylinder shaft 32 provides rotational attachment to the respective trunnion mount 22 via a horizontal trunnion shaft 24 forming a three-piece yoke mechanism. Each trunnion shaft 24 extends through and is press-fitted into respective trunnion shaft aperture portions 25 of each trunnion mount 22. Coincidentally, said trunnion shaft 24 is slip-fitted through a center-positioned cylinder shaft aperture portion 33 of each cylinder shaft 32. Both trunnion shafts 24 and cylinder shaft apertures 33 are aligned along a common axis, thereby allowing smooth angular rotation of the air foil 20 to produce a desired aerodynamic effect. Upon rotation of the air foil 20 to a desired angular position, said air foil 20 is secured by the user being positioned upon a ladder, and threadingly engaging the pairs of threaded knob/stud fasteners 90 through the trunnion mounts 22. Each trunnion mount 22 is illustrated here utilizing a pair of knob/stud fasteners 90 being inserted into opposing sides of the trunnion mount 22, each knob/stud fastener 90 passing through a trunnion aperture 26 and subsequently being threaded into respective fastening aperture portions 94 of each cylinder shaft 32. Said trunnion apertures 26 are arranged in an equally-spaced manner along an arcuate lower edge of each trunnion mount 22. It is envisioned that said knob/stud fasteners 90 may comprise common commercially available components having "T"-shaped handles or round knurled knobs for ergonomic grasping, thereby allowing a user to tightly secure the air foil 20 in position. However, it is further understood that various attachment mechanisms to secure said air foil 20 to the trunnion mounts 22 may be utilized without deviating from the concept and as such should not be interpreted as a limiting factor of the apparatus 10.

Figure 6:
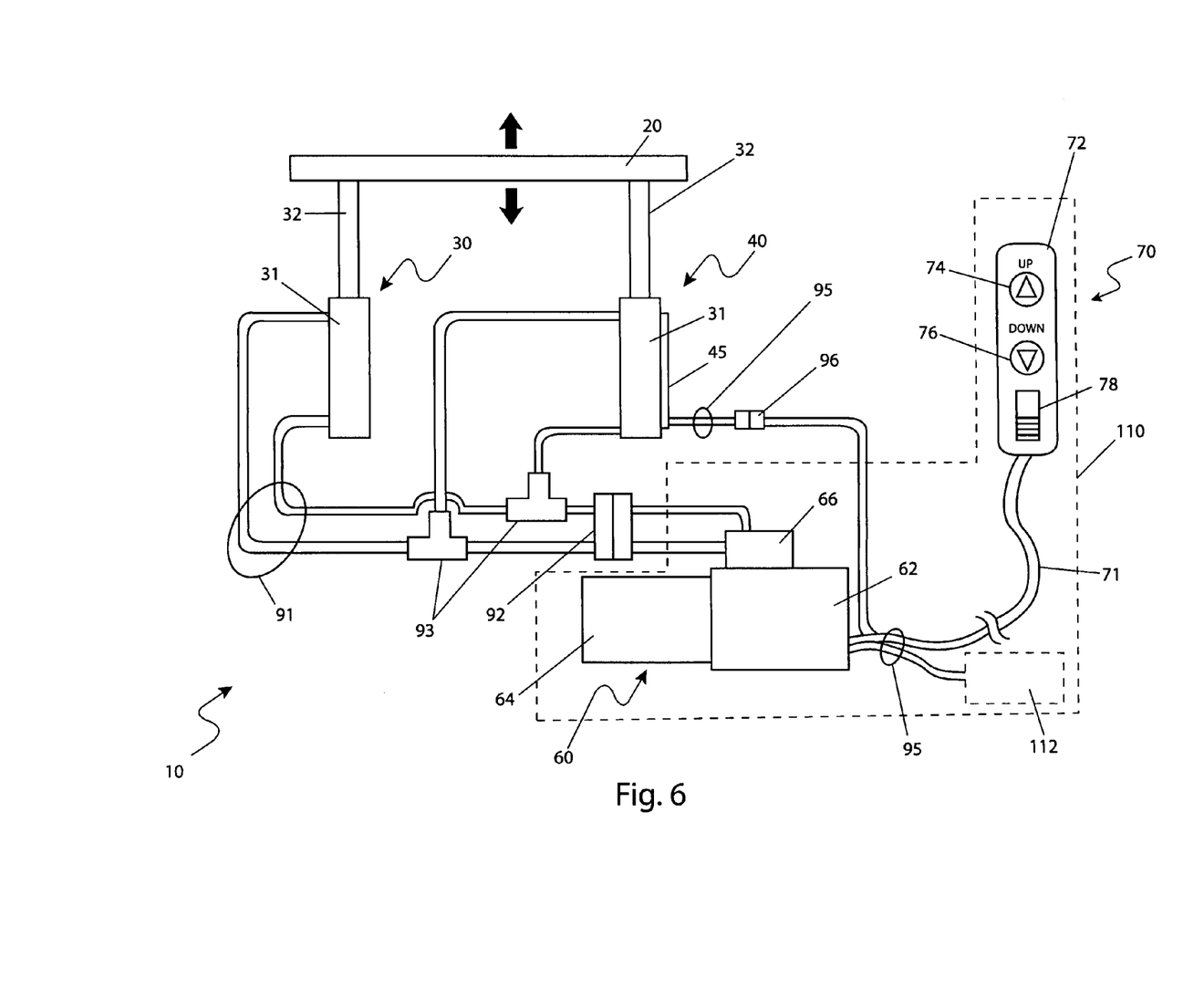

Referring now to FIG. 6, a control block diagram of the apparatus 10, according to the preferred embodiment of the present invention, is disclosed. The apparatus 10 provides vertical positioning of the air foil 20 via remote electrical activation of a hydraulic pump system 60 by an operator, being initiated via a remote controller assembly 70. The remote controller assembly 70 and the hydraulic pump system 60 are envisioned to be mounted within a cab portion of the semi-tractor 110. Furthermore, the remote controller assembly 70 is envisioned to be mounted to a dashboard portion of said semi-tractor 110, being conveniently accessed by an operator.

The remote controller assembly 70 comprises a remote controller cord 71, a protective rectangular plastic controller housing 72, an "UP" button 74, a "DOWN" button 76, and a height indicator 78. Said controller housing 72 further comprises various internal electronic equipment such as circuit boards, microprocessors, and the like, required for operation of the remote controller assembly 70. Said "UP" 74 and "DOWN" 76 buttons comprise common contact-closure switches to provide electrical activation of a solenoid valve portion 66 of the hydraulic pump system 60, thereby causing motioning of the air foil 20. Additionally, the encoder portion 45 of the second hydraulic cylinder assembly 40 provides real-time visual communication of a height of the air foil 20 via graphical display of the height indicator portion 78 upon a front surface of the remote controller assembly 70. Said encoder 45 conducts a sensor signal via common wiring 95 to the remote controller assembly 70, and is also easily detachable from the semi-tractor 110 via a common multi-conductor electrical connector 96.

The remote controller assembly 70 is illustrated here in a preferred embodiment being "hard-wired" via a remote controller cord 71 to the hydraulic pump system 60 and the cylinder position encoder 45; however, it is understood that the apparatus 10 may also be introduced having a wireless controller assembly 70 utilizing radio frequency (RF) or other wireless technologies while providing equal benefit without deviating from the concept, and as such should not be interpreted as a limiting factor of the apparatus 10.

The hydraulic pump system 60 is envisioned to comprises a commercially-available self-contained unit comprising standard features including a hydraulic pump 62, a DC motor 64, a three-position electric solenoid valve 66, a pair of pump hoses 68, an internal fluid reservoir, and a reservoir vent. The hydraulic pump system 60 is to be connected to an existing battery portion 112 of the semi-tractor 110 via common wiring 95. Said hydraulic pump system 60 comprises conventional fluid supply and return hydraulic hoses 91 which extend to the cylinder assemblies 30, 40. Said hydraulic hoses 91 further provide convenient connection and disconnection via a common in-line pressurized hose connector 92, thereby enabling fluid detachment of the apparatus 10 in an event that the semi-tractor 110 is to be detached from the semi-trailer 100. Said hydraulic hoses 91 further comprise respective "T"-fittings 93 to direct a flow of pressurized hydraulic fluid to both hydraulic cylinder assemblies 30, 40, thereby enabling synchronous motioning of the cylinder shaft portions 32 of the hydraulic cylinder assemblies 30, 40 to smoothly raise and lower the air foil 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIG. 1.

The method of installing the apparatus 10 may be achieved by performing the following steps: procuring and unpacking the various parts and sub-assemblies of the apparatus 10; installing the hydraulic cylinder assemblies 30, 40 at respective right and left positions to the pedestal cross-member 56 by affixing the cylinder flange portions 35 of each cylinder assembly 30, 40 to said pedestal cross-member 56 using provided common fasteners 115, if not previously assembled; mounting the air foil 20 to the cylinder shafts 32 by aligning respective trunnion shaft apertures 25 and cylinder shaft apertures 33 and pressing the trunnion shaft 24 into said apertures 25, 33, if not previously installed; fastening the mounting bar portion 52 if the pedestal assembly 50 onto a front cross-member of a chassis portion of a semi-trailer 100, a tank trailer 102, a flat bed trailer 104, or the like; routing and securing the hydraulic hoses 91, "T"-fittings 93, and wiring 95 using common attaching devices such as tie-wraps, wire brackets, or the like; rotating the air foil 20 and integral trunnion mounts 22 until obtaining a desired air foil 20 angle; securing the air foil 20 in said desired angular position by aligning opposing trunnion pivot apertures 26 with corresponding fastener aperture portions 94 of the cylinder shafts 32; threadingly engaging and tightening said knob/stud fasteners 90 into said apertures 26, 94; installing the hydraulic pump system 60 on or within the semi-tractor 110 in accordance with manufacturers instructions using the hardware supplied with the unit; routing and securing the pump hoses 68 using common attaching devices such as tie-wraps, wire brackets, or the like; providing power to the hydraulic pump system 60 by routing and connecting wiring 95 to the existing battery 112 of the semi-tractor 110; routing the remote controller cord 71 within the cab portion of the semi-tractor 110; and, mounting the remote controller assembly 70 upon a dashboard or other convenient location within the semi-tractor 110 using supplied brackets, fasteners, and the like.

The method of utilizing the device 10 may be achieved by performing the following steps: coupling the semi-trailer 100 to the semi-tractor 110 in a conventional manner; connecting the hose connector 92 and the electrical connector 96 to join semi-trailer-based 100 portions with semi-tractor-based 110 portions of the hydraulic and electrical circuits; raising or lowering the air foil 20 to a desired height by pressing either the "UP" button 74 or "DOWN" button 76 portions of the remote controller assembly 70 while observing a graphical representation of a height of the air foil 20 upon the height indicator portion 78 of the remote controller assembly 70; adjusting a height of the air foil 20 as needed during transit using the "UP" 74 and "DOWN" 76 buttons, thereby maintaining a safety means to said air foil 20 to compensate for low overhead conditions presented by bridges, underpasses, and other height-restricting structures; and, benefiting from variable and adjustable aerodynamic effects provided while utilizing the present invention 10 upon a tractor-trailer rig 150.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. An air foil system mountable to a trailer portion of a vehicle; comprising:
    a mounting assembly attachable to a forward lower edge of said trailer portion;
    a height adjustment assembly having a lower portion affixed to said mounting assembly;
    an air foil body, further comprising an airplane wing-type airfoil structure providing a tapered trailing-edge design and having a width approximately equal to a width of said trailer portion;
    a pair of trunnion mounts protruding downwardly from a bottom surface of said air foil body and affixed to an upper portion of said height adjustment assembly;
    wherein said air foil body, when attached, is adapted to aerodynamically effect a flow of air over said vehicle;
    wherein said air foil body further comprises a corrosion-resistant and lightweight material;
    wherein said height adjustment assembly provides a selectable height adjustment to said air foil body; and,
    wherein said pair of trunnion mounts enables said air foil body to pivot, thereby providing a selectable angular adjustment in relation to a longitudinal axis.

2. The air foil system of claim 1, wherein said air foil body further comprises a spoiler-type structure having a flat surface.

3. The air foil system of claim 1, wherein said mounting assembly further comprises a resilient unitary rectangular structure further comprising:
    a horizontal rectangular bottom mounting bar;
    a pair of opposing vertical pedestal legs each affixed to an upper surface of said bottom mounting bar with a pedestal foot; and,
    an upper pedestal cross-member which is affixed to and horizontally spans said pair of pedestal legs;
    wherein said bottom mounting bar is mounted to said trailer portion of said vehicle; and,
    wherein said height adjustment assembly is mounted to an upper surface of said upper pedestal cross-member.

4. The air foil system of claim 1, wherein said height adjustment assembly further comprises:
    a pair of hydraulic cylinders, each comprising a lower cylinder body affixed to said mounting assembly with a mounting flange and an upwardly extending cylinder shaft telescopically traveling within said lower cylinder body;
    a hydraulic pump system mounted within said vehicle and in fluid communication with said pair of hydraulic cylinders, further comprising:
        a reservoir of a hydraulic fluid;
        a pump for transferring said hydraulic fluid to said pair of hydraulic cylinders, said pump in electrical communication with an external power source;
        a valve located at an outlet of said pump;
        a pressurized supply and return hose at an outlet of said valve for transferring said hydraulic fluid; and,
        a detachable connector for each of said supply and return hose to each of said pair of hydraulic cylinders; and,
    a control assembly in electrical communication with said hydraulic pump system for selectably adjusting a height of said air foil body;
    wherein control assembly provides a synchronous raising and lowering of said pair of hydraulic cylinders.

5. The air foil system of claim 4, wherein said control assembly further comprises:
    a protective controller housing comprising internal electronic circuitry;
    an "UP" button and a "DOWN" button for selectably raising and lowering said height adjustment assembly; and,
    an electrical connection to said height adjustment assembly.

6. The air foil system of claim 5, further comprising a linear encoder connected to one of said pair of hydraulic cylinders and in electrical communication with said control assembly;
    wherein said linear encoder electrically communicates an extended height of said one of said pair of hydraulic cylinders and said extended height is displayed on said control assembly.

7. The air foil system of claim 6, wherein said electrical connection further comprises an electrical cord with a detachable connection.

8. The air foil system of claim 6, wherein said control assembly further comprises a wireless connection.

9. The air foil system of claim 6, wherein said pair of hydraulic cylinders provide approximately two feet of vertical telescoping motion.

10. The air foil system of claim 1, wherein said pair of trunnion mounts each further comprises:
    a semi-circular parallel protruding member having an intermediate gap for receiving an upper portion of said height adjustment assembly;
    a horizontal trunnion shaft extending through aligned trunnion shaft aperture portions of said protruding member and through a cylinder shaft aperture of said upper portion of said height adjustment assembly;
    a plurality of angular adjustment securing apertures equally spaced along an angular centerline on opposing outer surfaces of said protruding member; and,
    a pair of angular adjustment securing fasteners correspondingly inserted into a desired one of said plurality of angular adjustment securing apertures and aligned cylinder securing apertures on opposing outer surfaces of said upper portion of said height adjustment assembly;

wherein said pair of trunnion mounts is manually incrementally adjusted to a desired angular adjustment.

11. The air foil system of claim 10, wherein said desired angular adjustment is limited to approximately twenty degrees downward and twenty degrees upward relative to a horizontal plane.

12. An air foil system mountable to a trailer portion of a vehicle; comprising:
- a mounting assembly, further comprising:
  - a horizontal rectangular bottom mounting bar attachable to a forward lower edge of said trailer portion;
  - a pair of opposing vertical pedestal legs each affixed to an upper surface of said bottom mounting bar with a pedestal foot; and,
  - an upper pedestal cross-member which is affixed to and horizontally spans said pair of pedestal legs;
- a height adjustment assembly, further comprising:
  - a pair of hydraulic cylinders, each comprising:
    - a lower cylinder body affixed to said mounting assembly with a mounting flange; and,
    - an upwardly extending cylinder shaft telescopically traveling within said lower cylinder body, further comprising a cylinder shaft aperture routed through an upper portion thereof and a pair of aligned cylinder securing apertures on opposing outer surfaces of an upper portion thereof subjacent to said cylinder shaft aperture;
  - a hydraulic pump system mounted within said vehicle and in fluid communication with said pair of hydraulic cylinders, further comprising:
    - a reservoir of a hydraulic fluid;
    - a pump for transferring said hydraulic fluid to said pair of hydraulic cylinders, said pump in electrical communication with an external power source;
    - a valve located at an outlet of said pump;
    - a pressurized supply and return hose at an outlet of said valve for transferring said hydraulic fluid; and,
    - a detachable connector for each of said supply and return hose to each of said pair of hydraulic cylinders;
  - a control assembly in electrical communication with said hydraulic pump system for selectably adjusting a height of said air foil body; and,
  - a linear encoder connected to one of said pair of hydraulic cylinders and in electrical communication with said control assembly;
- a resilient and lightweight air foil body;
- a pair of trunnion mounts protruding downwardly from a bottom surface of said air foil body, each further comprising:
  - a semi-circular parallel protruding member having an intermediate gap for receiving an upper portion of each of said pair of hydraulic cylinders;
  - a horizontal trunnion shaft extending through aligned trunnion shaft aperture portions of said protruding member and said cylinder shaft aperture of each of said pair of hydraulic cylinders;
  - a plurality of angular adjustment securing apertures equally spaced along an angular centerline on opposing outer surfaces of said protruding member; and,
  - a pair of angular adjustment securing fasteners correspondingly inserted into a desired one of said plurality of angular adjustment securing apertures and aligned said cylinder securing apertures of each of said pair of hydraulic cylinders;

wherein said air foil body, when attached, is adapted to aerodynamically effect a flow of air over said vehicle;

wherein said height adjustment assembly provides a selectable height adjustment to said air foil body;

wherein control assembly provides a synchronous raising and lowering of said pair of hydraulic cylinders;

wherein said linear encoder electrically communicates an extended height of said one of said pair of hydraulic cylinders and said extended height is displayed on said control assembly;

wherein said pair of trunnion mounts enables said air foil body to pivot, thereby providing a selectable angular adjustment in relation to a longitudinal axis; and, wherein said pair of trunnion mounts is manually incrementally adjusted to a desired angular adjustment.

13. The air foil system of claim 12, wherein said air foil body further comprises an airplane wing-type airfoil structure providing a tapered trailing-edge design and having a width approximately equal to a width of said trailer portion.

14. The air foil system of claim 12, wherein said air foil body further comprises a spoiler-type structure having a flat surface.

15. The air foil system of claim 12, wherein said control assembly further comprises:
- a protective controller housing comprising internal electronic circuitry;
- an "UP" button and a "DOWN" button for selectably raising and lowering said height adjustment assembly; and,
- an electrical connection to said height adjustment assembly.

16. The air foil system of claim 15, wherein said electrical connection further comprises an electrical cord with a detachable connection.

17. The air foil system of claim 15, wherein said control assembly further comprises a wireless connection.

18. The air foil system of claim 15, wherein said pair of hydraulic cylinders provide approximately two feet of vertical telescoping motion.

* * * * *